July 19, 1966  O. P. GANDHI  3,261,982
FREQUENCY SHIFTER USING DOPPLER REFLECTION OF MICROWAVES
FROM MOVING PLASMA BOUNDARY IN SEMICONDUCTOR
Filed July 27, 1962
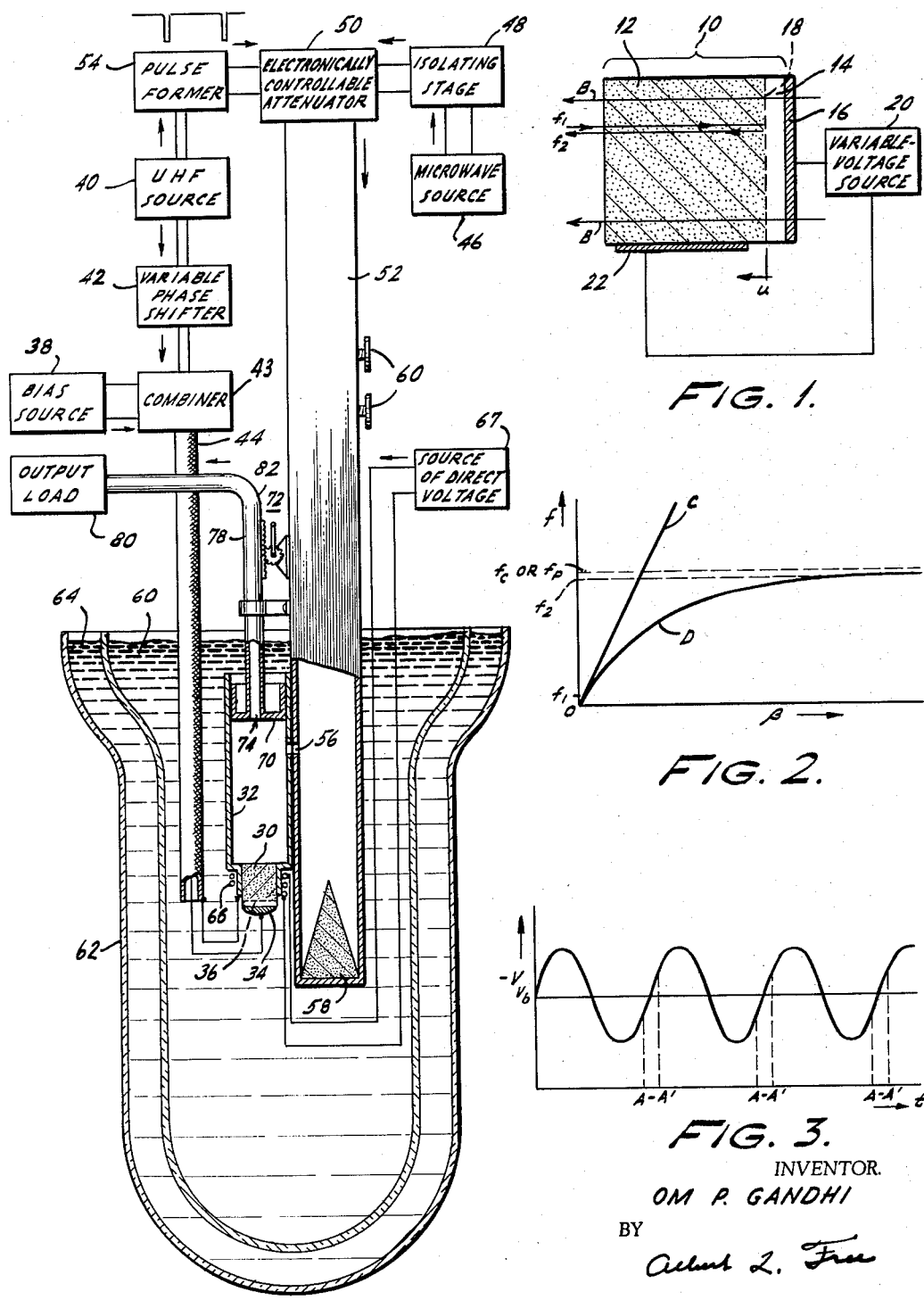
FIG. 4.
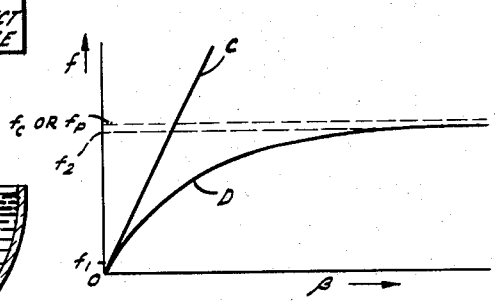
FIG. 1.
FIG. 2.
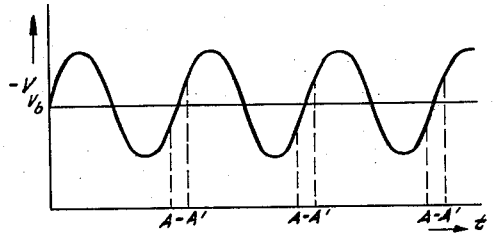
FIG. 3.
INVENTOR.
OM P. GANDHI
BY
ATTORNEY

United States Patent Office

3,261,982
Patented July 19, 1966

3,261,982
FREQUENCY SHIFTER USING DOPPLER REFLECTION OF MICROWAVES FROM MOVING PLASMA BOUNDARY IN SEMICONDUCTOR
Om P. Gandhi, Philadelphia, Pa., assignor to Philco Corporation, Philadelphia, Pa., a corporation of Delaware
Filed July 27, 1962, Ser. No. 212,973
16 Claims. (Cl. 307—88.3)

This invention relates to devices and methods for producing high-frequency electromagnetic waves, and particular to such devices and methods for controlledly shifting the frequency of longer wavelength waves to the so-called millimeter wavelength portion of the electromagnetic spectrum.

It is known in the prior art that when an electromagnetic wave is reflected from a moving object a Doppler shift of frequency of the reflected wave occurs due to the object motion. When the object has a velocity component opposite to the direction of incidence of the waves thereon an increase in frequency of the reflected wave occurs, while when the object has a velocity component in the same direction as the incident waves a decrease in the frequency of the reflected wave occurs. It is also known that the exterior of a gaseous plasma may be utilized as a reflector of electromagnetic waves, and the reflecting outer boundary of the plasma moved so as to produce a Doppler shift in the frequency of the reflected wave. If such arrangements could be made in practical form and with sufficiently rapid motion of the plasma, they would be useful in many applications in the electrical art for shifting or translating the frequency of electromagnetic waves, and specifically would be very useful in generating from a lower-frequency wave a wave having a frequency higher than that which can be produced easily or efficiently by other known means.

For example, there presently exists in the electromagnetic spectrum a region extending from about 100 kilomegacycles to nearly 10,000 kilomegacycles, corresponding to wavelengths from about 3 millimeters to nearly 0.03 millimeters, which lies between the highest commercially-used radio frequencies and the low, or infra-red, end of the light spectrum and which is designated herein as the millimeter wavelength region. This spectrum region has not heretofore been exploited, primarily for the reason that no satisfactory means has been known for generating electromagnetic waves in this spectrum region, especially if the waves are to be coherent in phase as is desired for many communication purposes. Opening of this previously-unexploited spectrum region would have many obvious benefits. One presently contemplated important application of such waves is for communications, especially from the earth to satellites or between satellites. Using these millimeter wavelength signals as carrier waves for communication information, the sizes of the system components required—particularly the antennas—can be greatly reduced, an advantage which is very important in satellite applications. When used for communication from earth to objects in space, the ability to use antennas of economically-feasible small sizes for the generation of extremely narrow beams of radiation is also highly advantageous. Other important applications and advantages of the use of waves in this frequency region will readily occur to one skilled in the art.

However, the above-described method of translating the frequency of wave signals to higher values by reflecting them from a rapidly-moving gaseous plasma has not been successful for generating millimeter waves in the above-described portion of the frequency spectrum. This is for the reason that since the incident wave in such a Doppler-shift system has a frequency which, due to difficulties in generation, must be appreciably below the edge of the millimeter-wavelength band, the reflected signal frequency cannot be raised to the desired values unless a frequency shift at least comparable to the original frequency, and preferably many times greater, can be produced. However, if such extremely large frequency shifts are attempted by use of the moving-plasma system described above, it is necessary to move the plasma boundary at velocities approaching the speed of light in free space, and movement of a plasma boundary at such extremely high relativistic velocities has not been found possible.

Accordingly it is an object of my invention to provide a novel device and method for shifting the frequency of an electromagnetic wave.

Another object is to provide such a device and method which is capable of producing an upward shift of the frequency of an original wave by an amount comparable to or larger than the original frequency.

It is a further object to provide a source of electromagnetic radiations in the millimeter range extending from about 100 kilomegacycles to nearly 10,000 kilomegacycles.

Still another object is to provide a device and method which will produce such waves with coherent phase relationships suitable for communication purposes.

It is also an object to provide such a device and method in which substantial powers of millimeter waves may be generated with reasonable efficiency.

A further object is to provide a method and device for shifting upwardly the frequency of an electromagnetic wave by an amount which is not necessarily harmonically related to the original frequency and which can be varied at will, and for providing signal amplification during the frequency-shifting process.

Another object is to provide a new device and method for producing a Doppler shift of the frequency of an electromagnetic wave.

A further object is to provide a new device and method for producing a slow-wave propagation mode for electromagnetic waves.

My invention, by which the above objectives are achieved, involves discovery of the facts that high-frequency electromagnetic waves can be caused to enter and to be reflected from the interior edge of a plasma in a semiconductor, that this edge can be varied in position electronically by altering the thickness of an adjacent depletion zone in the semiconductor so as to produce a Doppler shift in the frequency of the reflected waves, and that the phase velocity of the reflected waves in the plasma can be made so small compared to the velocity of light in free space that the velocity of the motion of the edge of the plasma is comparable to the phase velocity of reflected waves in the plasma. Because of this, extremely large Doppler shifts in frequency can be produced, easily amounting to multiples larger than one of the incident wave frequency, so that harmonics or frequencies between harmonics of the incident waves can be produced. I have further found that these frequency-shifted, reflected waves can be abstracted from the plasma and delivered to a load at their extremely high, upwardly-shifted frequency and in coherent phase, and that the device may therefore be used as a source of oscillations of extremely high frequencies, including millimeter-wave frequencies.

In particular, the incident wave may be in a very high, but conventional, frequency range such as the K-band microwave range, which is of the order of 11,000 to 36,000 megacycles per second, and by varying the position of the edge of the plasma with an ultra-high-frequency bias signal the original K-band radiations may be Doppler-shifted into the millimeter band extending from about 100 kilomegacycles to about 10,000 kilomegacycles. Thus millimeter waves having frequencies which are a multiple greater than one of the original incident frequency can be generated readily and controlledly. These millimeter waves may then be transmitted, for purposes of communication or the like, to a heat-sensitive receiver such as a bolometer or thermistor for example, or in types of systems in which coherent waves are required for communication purposes the receiver may instead utilize my generator of millimeter waves as a local oscillator supplying signals to a mixer to heterodyne the received, millimeter signals to conventional frequency ranges for ordinary receiver processing.

Accordingly, in accordance with the invention the above objects are achieved by the provision of a body of semiconductive material containing a plasma and a depletion zone immediately adjacent a boundary of said plasma which is electronically variable in extent so as to vary the position in said body of said boundary of said plasma, means for applying relatively lower-frequency electromagnetic waves to said body and for causing them to propagate through said plasma and to impinge said boundary of said plasma whence they are reflected back through said plasma, means for varying the extent of said depletion zone to vary the position of said reflecting boundary with a velocity having a component in a direction opposite to the direction of propagation of said impingent waves thereby to introduce an upward shift in the frequency of said reflected waves to a relatively higher frequency, means for providing in said body a phase velocity for said reflected waves of said relatively higher frequency which is low compared with the velocity of light in free space and preferably at least low enough to be of the same order as said velocity component of said reflecting boundary so that the upward shift of frequency produced by the motion of the plasma edge is at least comparable to the relatively-lower frequency of the impingent waves, and means for abstracting said reflected waves from said semiconductive body for delivery to a useful load device.

The term "plasma" as utilized herein designates a macroscopically charge-neutral aggregate of positively charged particles and negatively charged particles. Although previously applied principally to aggregates in the gaseous state, it is applied herein also to such aggregates in solid-state materials. Specifically, in the device of my invention the plasma consists of ionized fixed atoms in a semiconductor together with the holes and/or free electrons associated therewith. Associated with such a plasma is a plasma frequency $f_p$, which is the frequency of electromagnetic waves for which the plasma exhibits a dielectric constant of zero, and is equal to $$\frac{1}{2\pi}\left(\frac{q_e^2 N}{m\epsilon_o}\right)^{1/2}$$

where $q_e$ is the charge of an electron, N is the number of ionized impurity atoms per cubic centimeter in the plasma, $m$ is the effective mass of an electron in the plasma, and $\epsilon_o$ is the dielectric constant of the semiconductor material in the absence of the plasma. In the device of my invention the plasma frequency is made at least as large as the frequency of the Doppler shifted, reflected wave which is to be abstracted from the semiconductor to provide the output wave energy. This is accomplished merely by providing a sufficiently large value of N, the concentration of ionized impurity atoms. For example, to produce a plasma frequency of greater than 250 kilomegacycles/second it is only necessary to provide about $10^{14}$ to $10^{15}$ ionized impurity atoms per cc.

Also significant in determining the properties of the plasma is the cyclotron frequency $f_c$, which is the frequency at which an electron in the plasma traverses an orbit in a steady, uniform magnetic field and zero electric field, and equals $$\frac{q_e B}{2\pi m}$$

where B is the magnetic flux density in the plasma and the other symbols have the meanings indicated previously herein. The term "magnetoplasma" is used herein to indicate a plasma containing a magnetic flux of sufficient density to affect materially the properties of the plasma.

The term "depletion zone" is used herein in its usual sense to indicate a region in a semiconductive body which is depleted of mobile charge carriers as compared with the adjacent part of the semiconductor. As is well known, such a zone exists adjacent a rectifying barrier in a semiconductor and can be varied in width by increasing the reverse bias applied across the rectifying barrier. When, as in the device of the invention, a plasma is formed in the semiconductive body immediately adjacent an edge of a depletion zone for a given value of reverse bias, increasing the reverse bias causes the depletion zone to extend into the region formerly occupied by the plasma and therefore produces a movement of the adjacent edge of the plasma.

During operation of the invention, a plasma is produced in the semiconductive body which has a plasma frequency $f_p$ and a cyclotron frequency $f_c$, both of which are higher than the upwardly-shifted frequency $f_2$ of the output wave, and at least one of $f_c$ and $f_p$ is preferably only slightly higher than $f_2$. The plasma frequency $f_p$ may be controlled by providing a suitable number N of ionized atoms in the semiconductor, and the cyclotron frequency $f_c$ may be controlled by control of the magnitude of the magnetic flux density B in a longitudinal direction in the semiconductor i.e. parallel to the direction of propagation of waves therein. Using such values of $f_c$ and $f_p$, which are much higher than the frequency $f_1$ of the lower-frequency input wave, the input wave readily enters the semiconductor and propagates through it as a plasma wave. To reduce the extent of scattering by the lattice and the attendant signal attenuation, the semiconductor is preferably maintained at a reduced temperature for which such scattering is greatly reduced and the attenuation slight. In some semiconductors a suitable plasma can be produced merely by normal thermal excitation even at the reduced temperatures required to avoid undue attenuation, while in other semiconductors external stimulation such as light energy or impact ionization may be helpful or necessary in producing the required plasma at low temperatures.

The input wave of frequency $f_1$ then travels through the plasma until it reaches the interior edge of the plasma, whence it is reflected back through the plasma. During reflection this edge of the plasma is moved rapidly in a direction counter to the direction of the incident input waves by increasing rapidly the reverse bias of the potential barrier associated with the depletion zone. This produces an upward Doppler shift of the frequency of the reflected waves to the frequency $f_2$. The ratio of the reflected-wave frequency $f_2$ to the original frequency $f_1$ is given by the following relation:

$$\frac{f_2}{f_1} = \frac{1+u/v_{p1}}{1-u/v_{p2}}$$

where $u$ is the velocity of motion of the edge of the depletion zone in the direction of the reflected waves, $v_{p1}$ is the phase velocity in the plasma of the incident waves of frequency $f_1$, and $v_{p2}$ is the phase velocity of the reflected waves in the plasma. To produce large values of $f_2$ it is necessary to advance the depletion-zone edge with a large value of the velocity $u$, and since over substantial periods of time this cannot be done continuously, a varying reverse bias is preferably used. For example the reverse bias may be varied by an ultra-high-frequency sinusoid of voltage, in which case the input microwave signal is preferably pulsed so as to reach the reflective edge of the depletion zone only while the edge is moving in the direction of the reflected waves.

I have further found that by providing a plasma such that the reflected frequency $f_2$ is less than both the plasma frequencies $f_p$ and the cyclotron frequency $f_c$, but only slightly less than the smaller of $f_p$ and $f_c$, the reflected wave is heavily loaded by the plasma and propagates in the slow-wave mode so that its phase velocity $v_{p2}$ is much reduced from the free-space velocity of light and from the phase velocity $v_{p1}$ of the original-frequency incident wave in the plasma, and yet is not greatly attenuated in passing through the plasma. In fact the phase velocity $v_{p2}$ of the reflected plasma wave can thus be made comparable to the velocity of motion $u$ of the reflective depletion-zone edge. As shown by the above formula for the ratio of $f_2$ to $f_1$, this permits the generation of a reflected-wave frequency $f_2$ which is greater than the incident-wave frequency $f_1$ by a multiple greater than one. For example, an incident K-band frequency of about 25 kilomegacycles can be shifted in this way to about 250 kilomegacycles by moving the depletion zone at a velocity $u$ of about $0.9v_{p2}$; since $v_{p2}$ may readily be made as low at as about $10^7$ cm./second, the desired frequency shift upward by an order of magnitude can be provided by varying the depletion zone at about $10^6$ to $10^7$ cm./second with a U.H.F. signal. The reflected wave-energy may then be abstracted from the plasma at the Doppler shifted frequency $f_2$, as by an interferometer arrangement adjusted for maximum output at frequency $f_2$. Accordingly, by providing a medium in which the phase velocity of reflected waves is small compared with the speed of light, and by using an electronically-movable depletion-zone edge as the reflector of wave energy, Doppler shifts large enough to produce millimeter waves are obtained. In addition, I have found that the electrical power $P_2$ in the reflected wave is greater than the power $P_1$ of the incident wave in the following ratio:

$$P_2/P_1 = \frac{f_2}{f_1} \frac{1+u/v_{g1}}{1-u/v_{g2}}$$

where $v_{g1}$ is the group velocity of the wave incident on the depletion-zone edge and $v_{g2}$ is the group velocity of the wave in the semiconductor after reflection from the depletion-zone edge. Since $f_2$ may be many times greater than $f_1$, and $v_{g1}$ and $v_{g2}$ large compared with $u$, large power amplifications may be realized in the process.

Other objects and features of the invention will become apparent from the following detailed description in connection with the accompanying drawings, in which:

FIGURE 1 is a diagrammatic representation to which reference will be made in explaining the principle of the invention;

FIGURES 2 and 3 are graphical representations to which reference will be made in describing the operation of the invention; and FIGURE 4 is a representation, partly in block form, partly in section, and partly in plan view illustrating a preferred embodiment of the invention.

Referring now specifically to FIGURE 1 for illustration of the principle of the invention, an input electromagnetic wave at frequency $f_1$ is shown applied to one face of a semiconductive wafer 10. In accordance with the invention this wafer contains a plasma-filled region 12, indicated by stippling, and a depletion zone 14 formed by a rectifying contact 16 on the side of the wafer opposite the side impinged by the input wave. The input wave traverses the plasma and is reflected from the edge 18 of the depletion zone. At the time of reflection the depletion edge is moving with a velocity $u$ in the direction of the reflected wave and causes the waves to be Doppler shifted to the higher frequency $f_2$. This motion of the depletion-zone edge is produced by rapidly increasing the reverse voltage applied by source 20 between rectifying contact 16 and an ohmic contact 22 to body 10 on the side of the depletion zone opposite the rectifying connection. By using a semiconductive body 10 of suitable nature and by providing a longitudinal magnetic field of flux density B through the body parallel to the direction of propagation of the reflected waves, the phase velocity $v_{p2}$ of the reflected wave can be reduced to a small fraction of the velocity $c$ of waves in free space, and can be made substantially smaller than the phase velocity $v_{p1}$ of the incident waves of frequency $f_1$.

Considering first in more detail the properties of the semiconductor body 10, this should be capable of providing a plasma through which both the incoming wave $f_1$ and the reflected wave $f_2$ can propagate, with $f_2$ propagating at a low phase velocity $v_{p2}$ with respect to the velocity $c$ of light in free space, and of providing a reflective depletion zone of variable thickness adjacent the plasma. The palsma is provided in the semiconductor by ionization of impurity atoms in the semiconductor through removal of electrons to the conduction band or to the valence band in accordance with known principles of semiconductor action. Such ionization can be produced by thermal activation, i.e. by the effect of heat in causing a predetermined percentage of the impurity atoms to be ionized at all times, or by other methods of imparting energy to the electrons of the impurity atoms, such as by application of electromagnetic radiations of sufficiently high frequencies (e.g. photons) or by applications of a potential difference sufficiently great to produce impact ionization of impurity atoms. The concentration N or ionized impurity atoms, in the case of thermal activation, increases with increases in temperature and with decreases in the energy required to ionize each impurity atom. These factors are now so well known that the value of N due to thermal activation can readily be determined for any given semiconductor and temperature. Similarly the frequency and intensity of electromagnetic radiation and of impact ionization voltage required to produce a given value of N can be computed as well as determined experimentally. Accordingly the plasma frequency, which equals $$\frac{1}{2\pi} \left( \frac{q_e N}{m \epsilon_o} \right)^{1/2}$$

can readily be adjusted to suit the particular application. As mentioned previously, the plasma frequency $f_p$ is made greater than the reflected-wave frequency $f_2$. Similarly the magnetic flux density B in the plasma is also made large enough to produce a cyclotron frequency greater than $f_2$. The significance of the choice of $f_p$ and $f_c$ with regard to $f_2$ will appear more clearly from consideration of FIGURE 2.

FIGURE 2 is a plot of wave frequency as ordinates against wavelength-constant $\beta$ as abscissae, where the wavelength-constant is the imaginary part of the propagation constant for electromagnetic waves and equals $2\pi f \sqrt{\mu \epsilon}$. A large value of $\beta$ indicates a small phase velocity $v_p$ and vice-versa. For propagation in free space, $\mu$ is a constant and $\epsilon$ is a constant $\epsilon_0$, and therefore the plot of $\beta$ against $f$ is a straight line as indicated in FIGURE 2 by the line marked C. However, in a magneto-plasma such as I employ in my device, $\beta$ varies along the curve D. At frequencies approaching $f_p$ or $f_c$, whichever is lower, the plasma loads the wave heavily, causing its phase velocity to decrease markedly, as indicated by the rapidly increasing values of $\beta$ shown in FIGURE 2. More particularly, at or above the lower of $f_p$ and $f_c$ this wave-propagation mode is severely attenuated, while just below this value the phase velocity decreases very rapidly with increasing frequency. For example, for a reflected-wave frequency $f_2$ which is about 12 megacycles less than the smaller of $f_p$ and $f_c$, the phase velocity may be reduced to about one-thousandth of the free space velocity. Accordingly, absolute phase velocities in the plasma of the order of $10^7$ cm./second are readily achievable in this way.

In addition to slowing the reflected wave, the semiconductor is preferably designed to minimize unnecessary attenuation at both $f_1$ and $f_2$. To this end the wafer 10 is preferably made thin, e.g. of the order of 100 mils, and is of single-crystalline material. Also, it is known that attenuation of a wave passing through a semiconductive body increases with increased temperature of the body, and therefore it is desirable from this viewpoint to operate the semiconductor at reduced temperature. However, reducing the temperature decreases the thermal activation of the impurity atoms, tending to decrease the concentration N of ionized impurity atoms, and hence the plasma frequency. For some materials, such as ordinary semiconductive InSb, the value of N is sufficiently great even at about 4° Kelvin to produce an adequate plasma. However with other materials such as germanium and silicon containing the usual columns III or V dopants, only small values of N and correspondingly low plasma frequencies are obtained by conventional thermal action. In the latter case the plasma can be created by using radiation or impact ionization to create the necessary plasma, in place of thermal activation.

The depletion zone 14 of FIGURE 1 can readily be provided in a manner known to those skilled in the art, for example by merely forming an alloyed rectifying junction in one face of the plasma-filled semiconductive wafer 10. The thickness of this zone increases substantially as the square-root of the reverse voltage applied between the rectifying contact and the ohmic contact 22 to the opposite side of the barrier. At lower frequencies the reverse voltage may have the form of a sawtooth wave with the ramp portion corresponding to increases in reverse bias. However, to move the depletion zone with high values of the velocity $u$, high-frequency signals are preferably employed for which it becomes difficult to produce other than a sinusoid of voltage. This is true, for example, of U.H.F. voltages of about 200 m.c.s. such as are preferably employed for this purpose.

The velocity $u$ of the depletion-zone edge increases not only with increase in frequency of the applied control signal but also with increase in amplitude of the sinusoid. The portion of the sinusoid which is most useful in producing the desired upward shift of the frequency of the reflected wave is that which extends immediately on both sides of the zero A.-C. axis, in which portion the voltage is increasing most rapidly in the reverse direction.

For example, as shown in FIGURE 3 in which ordinates represent reverse voltage for the case of an N-type semiconductive wafer while abscissae represent time, in the time regions A–A' the voltage is increasing rapidly and nearly linearly in the reverse direction and is suitable for moving the depletion zone with the required velocity. Although not necessary, it is preferred to limit the impingement of incident waves on the moving, reflective, depletion-zone edge to those time portions of each cycle of the control signal which are indicated by the time intervals A–A', which may be readily accomplished by supplying the incident wave in time-spaced pulses occurring only during such intervals. To avoid the interference with speed of operation which would occur if the voltage were permitted to swing beyond zero to the forward or injecting direction, I prefer also to employ a fixed reverse bias $v_b$ greater than the amplitude of the sinusoid, as is also indicated in FIGURE 3.

Referring now to the specific embodiment of the invention represented in FIGURE 4, which is presented by way of example only and in which various parts are not necessarily to scale, the semiconductive wafer 30 in which the plasma and moving depletion zone are produced is mounted transversely of a waveguide 32 of non-magnetic material, such as non-magnetic stainless steel, suitable for propagating K-band microwaves. Wafer 30 may be of N-type single-crystalline indium antimonide having a resistivity of about 1 ohm-centimeter at room temperature and having a thickness of about 100 mils and transverse dimensions of about 0.0125" by 0.043". This wafer fits snugly into, and is ohmically soldered to, a portion of waveguide 32 having reduced transverse dimensions so that, when filled by wafer 30, it produces a characteristic impedance substantially matching that of the larger portion of the waveguide, thereby minimizing reflections of K-band microwaves impingement upon the upper side of wafer 30. A rectifying contact 34 covers the lower side of wafer 30, which protrudes slightly from the lower end of waveguide 32 so that the contact and its associated depletion zone are spaced from the waveguide. The depletion-zone edge 36 moves through the body 30 when the potential of contact 34 is made more negative with respect to the portion of the body 30 in contact with waveguide 32.

The potential applied to contact 34 is the sum of a D.-C. bias from bias source 38 and a U.H.F. sinusoid from U.H.F. source 40. The sinusoid may have a frequency of about 200 m.c.s. and, prior to application to contact 34, is passed through a conventional variable phase shifter 42 which is manually controllable to permit adjustment of the phase of the sinusoid at contact 34. The bias and the sinusoid are added together in combiner 43 and delivered to contact 34 by a suitable transmission line 44, such as a coaxial cable having its outer conductor connected to waveguide 32 and its inner conductor connected to contact 34. A suitable amplitude for the sinusoid is about 25 volts and a suitable bias is about 100 volts negative.

Time-spaced pulses of microwaves energy are supplied to the upper surface of wafer 30 at a repetition rate equal to, and controlled by, the frequency of the U.H.F. source 40. The microwave energy is generated as a continuous wave oscillation by microwave source 46, which may, for example, comprise a klystron or a backward-wave tube of conventional form operating at a K-band frequency of 25 kilomegacycles. The output of the microwave source is preferably passed through an isolating stage 48, such as a conventional ferrite isolator, to reduce reactions on the microwave source during operation of succeeding portions of the microwave system.

The time-spaced pulses of microwave energy are formed from the continuous microwave signals by applying the latter signals to an electronically controllable attenuator 50, which passes microwave energy to waveguide 52 only during the application thereto of pulses from pulse former 54. The latter pulses are formed in response to the U.H.F. sinusoid from source 40, one pulse being formed for each occurrence of a given phase condition of a sinusoid. Devices suitable for use as controllable attenuator 50 are well known in the art, typically comprising a semiconductor device positioned in a waveguide and normally biased so as to present severe losses for microwave frequencies but responsive to control pulses to assume a nearly lossless condition. Similarly, devices suitable for use as pulse former 54 are well known, and may for example comprise a so-called semiconductive "snap-diode" which produces a reverse current through the diode only for a brief time period immediately following each instant at which an applied sinusoid swings through zero into the reverse-bias polarity of the diode. Since devices suitable for use as attenuator 50 and pulse former 54 are known in the art, neither need be described in detailed herein.

Accordingly, K-brand microwave pulses synchronized with signals generated by U.H.F. source 40 are delivered to the K-band waveguide 52. Waveguide 52 may be soldered to waveguide 32 and an iris opening 56 provided in the adjacent walls of the two guides to permit propagation of the microwave pulses from waveguide 52 to the interior of waveguide 32, wherein they impinge upon the upper side of semiconductive wafer 30. A suitable terminating load 58 and conventional matching stubs 60 may be provided in waveguide 52 to facilitate delivery of maximum microwave power through opening 56.

During application of the microwave pulses and the U.H.F. control signal to body 30 and contact 34 respectively, the body is maintained at about 4° Kelvin and provided with a longitudinal magnetic field parallel to the axis of waveguide 32. The reduced temperature is provided in this example by immersing waveguides 32 and the adjacent portion of waveguide 52 in a refrigerant 60, such as liquid helium, contained in the middle-chamber of a two-chambered Dewar flask 62, the outer chamber also containing a refrigerant 64 such as liquid nitrogen. The magnetic field is produced by electric current flowing in a superconductive coil 66, typically of niobium wire, which surrounds the portion of waveguide 32 containing wafer 30. A source of direct voltage 67 connected to opposite ends of the coil produces current flow therein, a few volts of potential difference being sufficient in view of the very low resistance of the cooled wire. Such superconductive coils and associated apparatus suitable for operation at around 4° Kelvin are well known and commercially available, and hence are not shown or described herein detail. In the present embodiment a magnetic flux density of about 3,000 to 4,000 gauss may be utilized to provide a suitably-high value of cyclotron frequency $f_c$ in the semiconductor.

In accordance with the principles of the invention as described hereinbefore, the K-brand microwave pulses incident on the upper surface of wafer 30 enter the plasma therein, pass through the plasma as plasma waves of microwave frequency, and are reflected from the depletion-zone edge 36. The phase-shifter 42 is adjusted so that the control sinusoid applied to rectifying contact 34 traverses phase positions like those shown at A–A' in FIGURE 3 each time a microwave pulse is incident upon depletion-zone edge 36. The oscillatory energy of the reflected pulses then has a frequency $f_2$ dependent on the microwave frequency $f_1$, the upward velocity of the depletion-zone edge in wafer 30 and the phase velocities $v_{p1}$ and $v_{p2}$ of the waves in the plasma before and after reflection, according to the relation given hereinbefore for the ratio $f_2/f_1$. Accordingly by adjustment of these parameters the reflected-wave frequency can be adjusted to any preselected value in a continuous range of frequencies in the millimeter wavelength region, 250 kilomegacycles being typical.

As an example only, using values of $f_p$ and $f_c$ both equal to about 250 kilomegacycles and a semiconductive wafer having a cross-section of about 0.105" by 0.043", a phase velocity $v_{p2}$ of about $10^7$ cm./second is obtained for a reflected-wave frequency $f_2$ about 12.5 m.c. below $f_p$. This value of $f_2$ can readily be produced by adjusting the U.H.F. control signal to move the depletion-zone edge at a velocity $u$ of slightly less than $10^7$ cm./second. In this example the cross-sectional dimensions are specified because the velocity of the waves in the plasma depends on these dimensions in addition to the other velocity-affecting factors discussed previously. As is known, the velocity $v$ decreases with decrease of either lateral dimension, $1/v^2$ being substantially proportional to $1/A^2 + 1/B^2$, where A and B are the two lateral dimensions of a rectangular wafer. For a discussion of the dependence of $v$ on lateral dimensions, reference is made to the article by A. W. Trivelpiece and R. W. Gould entitled "Space Charge Waves in Cylindrical Plasma Columns" in Journal of Applied Physics for 1959, volume 30, pages 1784–1793.

To assist in the efficient abstraction from the semiconductor of the millimeter-wavelength reflected wave, a wave-reflective closure member 70 is provided in waveguide 32 on the opposite side of opening 56 from semiconductive body 30. This member fits slidably into the interior of the larger portion of waveguide 32 so that its longitudinal position therein can be varied readily and accurately, as by a suitable rack and pinion drive 72. Member 70 completely fills the cross-section of waveguide 32, except for a small central aperture 74 therein through which the millimeter-wavelength energy propagates to a waveguide 78, which is small enough in cross-section to have a cut-off frequency above the frequency $f_1$ of the microwaves entering by way of opening 56 but below the frequency $f_2$. Waveguide 78 terminates in an output load device 80, such as a horn-type antenna or other device for transmitting or otherwise utilizing the millimeter waves.

The spacing of reflective closure member 70 from the upper surface of semiconductive wafer 30 is adjusted to provide a resonant condition in which maximum millimeter-wavelength output is produced at load 80, as indicated by a detector and D.-C. meter, for example. Ordinarily this spacing will be a multiple of the wavelength of the millimeter waves, and therefore a plurality of maxima may be observed, any one of which may be used. This resonant structure serves to minimize losses which otherwise might occur due to reflection back into the plasma of emergent waves at frequency $f_2$ at the upper face of wafer 30. The operation of this portion of the structure is directly analogous to that occurring in an interferometer, as described for example in an article by W. Culshaw entitled "High-Resolution Millimeter Wave Fabry-Perot Interferometer" and appearing in "I.R.E. Transactions on Microwave Theory and Techniques," vol. 8, 1960, page 182 and hence need not be described here in detail. Also described in that article are diffraction gratings suitable for use in measuring the wavelength of the output millimeter waves, as may be desirable in adjusting the various parameters of the system to obtain the desired output.

When semiconductive materials having relatively high impurity activation energies, such as germanium and silicon, are used as the semiconductive wafer 30, the required ionization of impurity atoms at low temperatures may be produced by applying between opposite edges of the wafer a voltage large enough to produce impact ionization, in accordance with known principles. Alternatively, hole-electron pairs may be produced by directing light onto the body 30 by means of a light source located in the wall of waveguide 78 at the bend 82 therein, or by using a transparent film as contact 34 and directing the light onto the under side of contact 34 by way of a transparent window in the Dewar flask.

My method of producing a Doppler shift of electromagnetic waves by reflection from the edge of a depletion layer which is electronically variable in position and my method of producing a slow-wave propagation mode for millimeter waves by transmission through a semiconductor plasma of waves having a frequency near but less than the plasma frequency $f_p$ or the cyclotron frequency $f_c$, whichever is smaller, are especially useful in combination with each other to produce millimeter waves, as described above. However, each method is also new and useful in itself. For example my Doppler-shifting method is of general utility whenever it is desired to produce such shifts, as in a simulator of Doppler shifts due to motion of objects in space. Similarly my method for producing slow plasma waves at millimeter wavelengths is of general utility, for example for laboratory study of such waves or for use in devices involving interactions between waves and matter at frequencies higher than are practical using metal helices.

While the invention has been described with particular reference to specific embodiments thereof, it will be understood that the scope of the invention is limited only by the appended claims.

I claim:

1. Apparatus for producing a Doppler shift of the frequency of an electromagnetic wave which comprises a body of semiconductive material, a depletion zone in said body having an edge which is electronically variable in position, means for applying electromagnetic waves to said body so that they enter said body and impinge against said variable edge, and means for varying electronically the position of said edge while said waves are impingent thereon.

2. A slow-wave propagating device for millimeter waves comprising, a semiconductor containing a magnetoplasma provided by ionization of impurity atoms in at least a region thereof and a magnetic field traversing said region, said magnetoplasma being characterized by a plasma frequency $f_p$ and a cyclotron frequency $f_c$, and means for passing electromagnetic waves of frequency $f$ slightly less than the smaller of $f_c$ and $f_p$ through said magnetoplasma substantially parallel to the direction of said magnetic field.

3. Apparatus for shifting the frequency of an electromagnetic wave from a frequency $f_1$ to a higher frequency $f_2$, comprising:

a body of semiconductive material containing a magnetoplasma characterized by a plasma frequency $f_p$ and by a cyclotron frequency $f_c$ both higher than said frequency $f_2$, the lower of said frequency $f_c$ and said frequency $f_p$ being sufficiently close to said frequency $f_2$ that the phase velocity $v_{p2}$ in said magnetoplasma at said frequency $f_2$ is substantially lower than the velocity of light in free space and substantially lower than the phase velocity $v_{p1}$ in said magnetoplasma at said frequency $f_1$, a wave-reflective depletion zone located in said body immediately adjacent said magnetoplasma so that an edge region of said depletion zone substantially coincides with a boundary of said magnetoplasma, said depletion zone being controllable to vary the extension of said edge into said magnetoplasma and thus to vary correspondingly said boundary of said magnetoplasma, means for applying waves of said frequency $f_1$ to said body so that said waves of frequency $f_1$ enter and traverse said magnetoplasma and are then incident upon and reflected by said depletion-zone edge region, means for varying the position of said edge region of said depletion-zone with a velocity having a component in the direction of said reflected wave thereby to shift the frequency of said reflected wave to said frequency $f_2$, and means for abstracting said reflected wave at said frequency $f_2$ from said magnetoplasma.

4. The apparatus of claim 3, in which said magnetoplasma comprises ionized impurity atoms of said semiconductive material, and comprising also means for producing a magnetic field substantially parallel to the direction of propagation of said reflected wave.

5. Apparatus in accordance with claim 3, in which said frequency $f_2$ is sufficiently close to the lower of said frequencies $f_p$ and $f_c$ that said phase velocity $v_{p2}$ is many times lower than said phase velocity $v_{p1}$.

6. Apparatus in accordance with claim 3 in which said body is of indium antimonide, and comprising also means for maintaining said body at a temperature of a few degrees Kelvin.

7. Apparatus in accordance with claim 3, in which said body is provided with a rectifying connection and an associated potential barrier producing said depletion zone.

8. Apparatus in accordance with claim 3, comprising also means for refrigerating said body.

9. Apparatus in accordance with claim 3, comprising means for applying said waves of frequency $f_1$ to said depletion-zone edge only while said depletion-zone edge is moving with a velocity component opposite in direction to said incident waves.

10. Apparatus in accordance with claim 3, in which said frequency $f_1$ is in the microwave range.

11. Apparatus in accordance with claim 3, comprising means for varying the position of said depletion-zone edge with a velocity component having a direction opposite to that of said incident waves and having a magnitude comparable to said velocity $v_{p2}$ of said reflected wave.

12. Apparatus in accordance with claim 3, comprising a rectifying contact to said body for producing said depletion zone and means for applying to said contact a reverse bias and a periodic signal recurrent at an ultra-high frequency.

13. Apparatus in accordance with claim 3, comprising means for moving said depletion-zone edge intermittently during time-spaced intervals in a direction counter to said incident wave and means for restricting the application of said incident wave to said depletion-zone edge to said intervals.

14. Apparatus in accordance with claim 3, in which said means for abstracting said reflected wave comprises a wave-reflective chamber resonant at said frequency $f_2$.

15. Apparatus in accordance with claim 14, comprising a load device for waves of said frequency $f_2$ and frequency-selective means associated with said chamber for delivering waves of said frequency $f_2$ from said chamber to said device.

16. A millimeter-wave generator, comprising:

a wafer of semiconductive material containing a concentration N of ionized impurity atoms forming a plasma in said wafer and producing a plasma frequency $f_p$ at a predetermined temperature T, said frequency $f_p$ being above the lower edge of the millimeter-wave frequency band;

means for applying to said wafer a magnetic field producing in said plasma a cyclotron frequency $f_c$ above the lower edge of the millimeter-wavelength band;

means for maintaining said wafer at said temperature T for which said wafer is transmissive of electromagnetic waves of frequency less than the smaller of said frequencies $f_c$ and $f_p$;

a rectifying contact to one side of said wafer for producing a depletion-zone having an edge extending into said wafer to an extent which increases with increases in reverse bias applied to said contact and which is reflective of electromagnetic waves incident on the interior edge thereof;

means for applying time-spaced pulses of microwaves to the other side of said wafer so that said microwaves traverse said plasma substantially parallel to said magnetic field, impinge upon said interior edge of said depletion zone and are reflected thereby into said plasma;

means for applying to said contact a rapidly increasing reverse bias during said incidence on said depletion-zone edge of said pulses of microwaves, said reverse bias increasing at a sufficiently high rate to move said depletion-zone edge inwardly of said wafer with a velocity such that the Doppler-shifted frequency $f_2$ of said reflected wave is comparable to but slightly less than the lower of said frequencies $f_p$ and $f_c$; and a resonant chamber adjacent said other side of said wafer for abstracting said reflected wave of frequency $f_2$ from said wafer.

References Cited by the Examiner

UNITED STATES PATENTS 3,076,941 2/1963 Yariv _____ 321—69 X
3,205,370 9/1965 Ashkin et al. _____ 307—88.3

JOHN F. COUCH, *Primary Examiner.*

LLOYD McCOLLUM, *Examiner.*

J. J. KISSANE, G. GOLDBERG, *Assistant Examiners.*